United States Patent
Mah et al.

(10) Patent No.: US 8,562,901 B1
(45) Date of Patent: Oct. 22, 2013

(54) METHOD OF MAKING CRACK-FREE CERAMIC MATRIX COMPOSITES

(75) Inventors: Tai-Il Mah, Arlington, VA (US); Kristin A. Keller, Springboro, OH (US); Michael K. Cinibulk, Bellbrook, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 179 days.

(21) Appl. No.: 12/545,967

(22) Filed: Aug. 24, 2009

Related U.S. Application Data

(60) Provisional application No. 61/190,101, filed on Aug. 25, 2008.

(51) Int. Cl.
*B28B 3/00* (2006.01)
*B28B 1/00* (2006.01)

(52) U.S. Cl.
CPC ............................... *B28B 1/007* (2013.01)
USPC ................ 264/640; 264/641; 264/642

(58) Field of Classification Search
USPC .................................. 264/640–642
See application file for complete search history.

(56) References Cited

U.S. PATENT DOCUMENTS

| | | | | |
|---|---|---|---|---|
| 4,060,412 A | * | 11/1977 | Divecha | 419/17 |
| 4,284,664 A | * | 8/1981 | Rauch, Sr. | 427/180 |
| 5,024,978 A | * | 6/1991 | Allaire et al. | 501/95.2 |
| 5,480,707 A | * | 1/1996 | Steffier | 442/77 |
| 6,180,258 B1 | * | 1/2001 | Klier | 428/539.5 |

OTHER PUBLICATIONS

Chawla, Krishan. Composite Materials Science and Engineering. New York: Springer, 1998. pp. 48-71, 95-100, 213-218.*
Yoon et al (2007), Highliy Aligned Porous Silicon Carbide Ceramics by Freezing Polycabosilane/Camphene Solution, J. Am. Ceram. Soc, 90[6] 1753-1759.*
Kiyoshi, Araki, et al., "Porous Ceramic Bodies with Interconnected Pore Channels by a Novel Freeze Casting Technique," J. Am. Ceram. Soc., 88 [5] 1108-1114 (2005).
Kiyoshi, Araki, et al., "New Freeze-Casting Technique for Ceramics with Sublimable Vehicles," J. Am. Ceram. Soc., 87 [10] 1859-1863 (2004).
Levi, Carlos G., et al., "Processing and Performance of an All-Oxide Ceramic Composite," J. Am. Ceram. Soc., 81 [8] 2077-86 (1998).
Cinibulk, Michael K., et al., "Effect of Yttrium Aluminum Garnet Additions on Alumina-Fiber-Reinforced PorousAlumina-Matrix Composites," J. Am. Ceram. Soc., 87 [5] 881-887 (2004).

* cited by examiner

*Primary Examiner* — Joseph S Del Sole
*Assistant Examiner* — Russell Kemmerle, III
(74) *Attorney, Agent, or Firm* — AFMCLO/JAZ; Rebecca Greendyke

(57) ABSTRACT

The current invention provides a method to fabricate a crack-free continuous fiber-reinforced ceramic matrix composite by eliminating shrinkage stresses through a unique combination of freeze forming and a non-shrinking matrix composition. Cracks related to drying shrinkage are eliminated through freeze forming and cracks related to sintering shrinkage are eliminated by using a matrix that does not shrink at the given sintering temperature. After sintering, a crack-free ceramic composite is obtained.

17 Claims, 2 Drawing Sheets

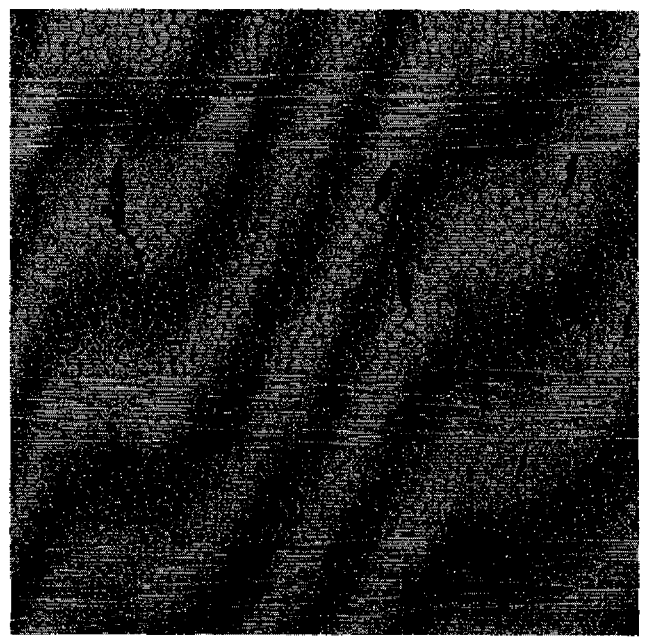
*Fig. 2a*  100μm
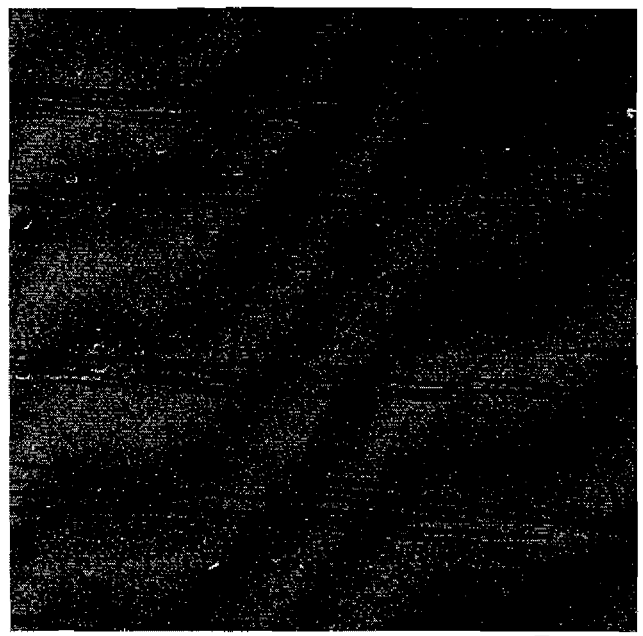
*Fig. 2b*  200μm

METHOD OF MAKING CRACK-FREE CERAMIC MATRIX COMPOSITES

CROSS-REFERENCE TO RELATED APPLICATIONS

This application claims the benefit of U.S. provisional application No. 61/190,101, filed on Aug. 25, 2008.

RIGHTS OF THE GOVERNMENT

The invention described herein may be manufactured and used by or for the Government of the United States for all governmental purposes without the payment of any royalty.

BACKGROUND OF THE INVENTION

The invention relates to the processing of crack-free ceramic matrix composites.

This process represents a major improvement to the state-of-the-art ceramic composite fabrication process. (Ceramic composite or ceramic matrix composite (CMC) as used herein, refers to continuous ceramic fibers reinforcing a ceramic "matrix" where the matrix is the material around the fibers bonding the assemblage into a rigid body.) Current oxide-oxide composite matrices suffer from transverse and interlaminar matrix cracks due to drying and sintering shrinkage in the presence of the constraining force imposed by a rigid and dense fiber network.

Currently, oxide-oxide ceramic matrix composites are produced by infiltrating oxide fibers, woven fabric or fiber preforms (fibers woven into a multi-axial structure) with an aqueous ceramic slurry. This slurry consists of ceramic powder, water, and various additives to improve the dispersion of the powder. The infiltrated fiber (woven fabric for example) is then stacked into a desired thickness and orientation, followed by consolidation using pressure and warm temperatures (generally below 400° C.). This step drives off the water and some other volatiles, yielding a solid but very weak "green" body. The green body is then sintered at high temperature (1100° C. or above) in air to produce the final ceramic composite. The sintering temperature is generally limited to a maximum of ~1250° C. due to strength loss in the fiber that results at higher temperatures. Due to the nature of the process, only porous matrix composites (>20% composite porosity) are produced using this method. Further, transverse and interlaminar cracks occur to relieve stresses that occur during drying and subsequent sintering of the matrix. The porosity and cracks are defects that limit the mechanical properties of the composite.

The processing method discussed in the current invention provides a method to avoid both the drying and sintering shrinkage cracks, through a combination of freeze forming and the use of a non-shrinking matrix.

Published work has demonstrated the efficacy of using camphene as an alternative vehicle to water for freeze-casting of monolithic (non-fiber-reinforced) ceramic. See, for example, K. Araki and J. W. Halloran, "New Freeze-Casting Technique for Ceramics with Sublimable Vehicles," *J. Am. Ceram. Soc.*, 87 [10] 1859-1863 (2004).

This invention utilizes camphene-based freeze casting for solving a very difficult processing problem; namely, the fabrication of continuous-fiber reinforced ceramic composites.

SUMMARY OF THE INVENTION

The current invention involves fabricating an oxide-oxide composite without cracks by eliminating drying and sintering shrinkage stresses through a unique combination of freeze forming with an alternative solid carrier vehicle (camphene) and a non-shrinking matrix composition. Shrinkage cracks that form during the evaporation of liquid infiltrant to form the "green" body (not yet heat-treated to convert the matrix material to a bonded ceramic solid) are eliminated by fabricating green composites above the melting temperature of the camphene (~45° C.) and then cooling to room temperature. The solid camphene is then sublimated (converted from solid to vapor without an intervening liquid phase) at room temperature without the shrinkage that occurs during drying. In conventional drying, a capillary pressure arises as liquid from the sample interior wicks to the exterior to prevent exposure of the higher energy solid/vapor interface versus the lower energy solid/liquid interface. This pressure ultimately results in shrinkage and cracking of the material. Sintering cracks resulting from shrinkage during heat-treatment to densify the matrix are avoided by using a matrix composition that is formulated such that the bonding of all the particles occurs by "neck" formation during sintering of one finely distributed component (e.g., $Al_2O_3$) during heat treatment, while the second, larger-particle component (e.g. YAG ($Y_3Al_5O_{12}$) or mullite ($Al_6Si_2O_{13}$)), is chosen to inhibit sintering shrinkage. The elimination of shrinkage cracks greatly increases the strength of the matrix and thereby significantly improves the interlaminar strength of the composites.

BRIEF DESCRIPTION OF THE DRAWINGS

FIG. 2(*a*) is a SEM micrograph of a standard oxide-oxide porous matrix composite.

FIG. 2(*b*) is a SEM micrograph of a composite produced according to the present invention.

DETAILED DESCRIPTION

Figure 1:
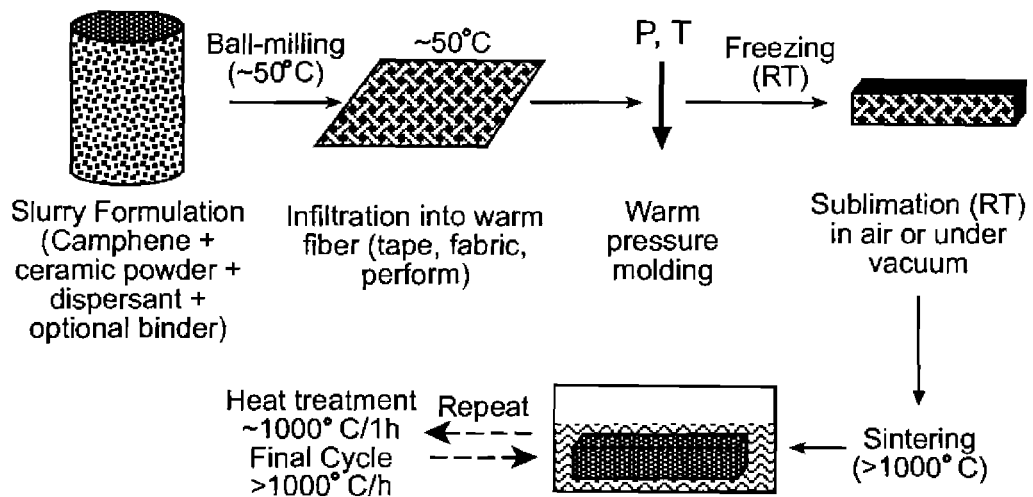
FIG. 1 is a schematic illustrating the composite processing steps of the present invention.

This invention involves fabricating a crack-free oxide-oxide composite by eliminating shrinkage stresses through a unique combination of freeze forming with an alternative solid carrier vehicle (camphene) and a non-shrinking matrix composition. FIG. 1 provides an overview of the composite process. The oxide fibers or fiber preforms are infiltrated with a slurry containing camphene, ceramic powder (such as $Al_2O_3$ and $Y_3Al_5O_{12}$ or mullite), an optional binder (such as Carbowax or other) and an optional dispersant (such as Perfad, HyperMer or other). The fiber and the slurry must be kept above the melting point of the solid carrier vehicle (for example, ~45° C. for camphene) during the infiltration and stacking process. The infiltrated fiber is stacked into the desired thickness and orientation, followed by consolidation into a green composite using pressure and warm temperatures (below 100° C.). The camphene undergoes a solid to vapor transformation through sublimation at ambient conditions (room temperature and atmospheric pressure). The green composite is exposed to air for a sufficient time to allow for the camphene to sublimate; alternatively, the composite can be exposed to vacuum to speed the sublimation process. By eliminating the camphene through sublimation, both the shrinkage that occurs during evaporation and the corresponding cracks in the matrix are avoided. The green composite is then sintered at high temperature (>1000° C.) in air.

In a preferred embodiment, the matrix composition is formulated to contain two distinct ceramic powder components. One component, such as $Al_2O_3$, is finer and forms necks between the particles during heat treatment, while the second component acts to inhibit sintering. The combination of the two allows for the formation of strong bonds between the particles without the cracks that typically form due to sintering shrinkage. Examples of sintering-inhibiting components are YAG ($Y_3Al_5O_{12}$) for Nextel 610 and 650 (3M Corp.) fibers/fabrics/preforms and mullite ($Al_6Si_2O_{13}$) for Nextel 720 (3M Corp.) fibers/fabrics/preforms. The final processed composite possesses strength, allowing it to withstand subsequent multiple infiltration cycles of matrix sol, which increases the matrix density to a level where considerable matrix strength is achieved. The increase in matrix strength significantly improves the interlaminar strength of the composites. As the matrix density increases, a weak interfacial coating may be needed on the fibers for damage tolerance.

The composite processing method thus described that produces a fiber-reinforced composite microstructure with no shrinkage cracks could be extended to other CMCs. This method comprises a two-step approach using freeze drying to eliminate drying shrinkage cracks and a non-shrinking matrix to eliminate sintering shrinkage cracks.

The fibers to process the composites can be either an oxide, such as Nextel 610, 650 or 720, or non-oxide, such as SiC. The fiber architecture of the composites can be either filament wound tapes, woven fabric or a multi-axial woven structure. The fiber architecture can also be chopped fibers, either randomly distributed or aligned.

The matrix material of the composites can be either oxide (for example, alumina, YAG, mullite, zirconia, zircon, spinel, or cordierite) or non-oxide (for example, SiC, $HfB_2$). The coefficient of thermal expansion (CTE) of the matrix material should be closely matched to the reinforcing fiber, meaning the product of the difference in CTE values and the maximum change in temperature during processing or service should be less than the allowable strain limit for either material. The CTE is a measure of the change in the linear dimension of the material as it is heated. Significantly different CTE values can result in stresses in the composite that ultimately lead to failure.

The freeze drying process utilizes camphene as a carrier material; however, any carrier vehicle that freezes at a temperature between −10° C. and 100° C. and sublimes at temperatures between ~0° C. and 100° C. in air or under vacuum is useable. Additives can also be used to tailor the freezing behavior of the material. In the case of camphene, ethanol can be used to lower its freezing temperature.

An additive is used to disperse the powder within the carrier vehicle during the composite processing. An optional binding agent can also be used to provide strength to the ceramic composite after sublimation of the carrier vehicle, but prior to the sintering process.

The matrix material for the composite processing is a mixture of a larger particle size oxide material that sinters poorly, such as YAG or mullite, and a smaller particle size binding phase, such as alumina. Similar mixtures of larger particle size non-oxide powder that sinters poorly and a smaller particle size binding phase can also be used.

The average particle size of the larger material for the composite processing is between 0.5-4 microns in size, while the average particle size of the smaller material for the composite processing is between 0.01-0.5 microns in size.

In some cases, a coating on the fiber may be added to facilitate crack deflection and to protect the fiber from environmental damage during composite processing and during use.

The following non-limiting example illustrates the invention:

Example

Nextel 610 fabric (8HSW, 3M Corporation) was cut into ~4"×4" pieces and desized at 850° C. in air for 30 min. Alumina powder (AKP-53, Sumitomo Corp., Tokyo, Japan) was used in the as-received condition (average particle size ~0.2 µm). YAG ($Y_3Al_5O_{12}$) powder was obtained from a commercial source (Sasol North America, Inc., Ceralox Division, Tucson, Ariz.). Due to the large YAG particles in the as-received powder, the as-received powder was ball milled for ~100 hours using high purity alumina balls (1 cm dia., SSA-999W, Tosoh, Japan) to reduce the particle size. The average particle size and size distribution were measured (LS 230 Particle Size Analyzer, Beckman Coulter) after ball-milling and the mean particle size was determined to be 1.6 µm.

For the solid carrier vehicle, camphene ($C_{10}H_{16}$) was used in the as-received condition (Alfa Aesar, Ward Hill, Mass.). Based on the manufacturer's description, it has a density of 0.85 g/cm$^3$, a melting point of 44-48° C., and a boiling point of 159-160° C. Following Araki and Halloran [10], Perfad 9013 (UniQema, Everburg, Belgium) was used as the solid dispersant in camphene. Polyethylene glycol (Carbowax™ Sentry™ Polyethylene Glycol 8000, Dow Chemical Co., Midland, Mich.) was used as a binder.

The overall composite processing flow chart is shown in FIG. 1. The solid (50:50 volume % alumina+YAG) content in the slurry was kept at 40 volume % for the current study. The actual volume % of the solid was slightly higher than 40%, since some camphene vaporized during processing, due to its high vapor pressure above the melting temperature (over 1 kPa). The appropriate amount of de-aired slurry was dispersed onto the Nextel 610 fabric and infiltrated into the fabric tow using a serrated roller on the top of a hot plate, maintained at ~60° C. It is assumed that a certain degree of camphene evaporation took place during this processing step as well. Eight layers of Nextel 610 fabric were typically used in a symmetric and balanced (warp/fill) lay-up. The stacked slurry-infiltrated fabric preform was transferred to an aluminum plate. The green composites were prepared using either warm pressure molding or an autoclave. After de-molding, the green composites were placed in the laboratory fume hood for up to 48 hrs to complete the freeze-drying (sublimation) process. The composites were subsequently heat-treated at 1200° C. for 5 h in air.

The resultant composites were sectioned for microstructural analysis using scanning electron microscopy (SEM, Model Leica Cambridge Stereoscan 360FE, LEO Microscopy, Inc., Cambridge, U.K.). Microstructural analysis of the composites revealed that no observable cracks were present, in contrast to the cracked microstructures produced by typical composite processing routes (FIG. 2). In particular, FIG. 2a is an SEM micrograph of a standard oxide-oxide porous matrix composite showing transverse cracks in the matrix. FIG. 2b is SEM micrograph of a composite produced according to the current invention, showing no observable cracks.

What is claimed is:

1. A method for producing a porous continuous-fiber-reinforced ceramic matrix composite structure with no matrix shrinkage cracks comprising:
   a) infiltrating, ceramic fibers or fiber preforms with a slurry containing camphene, at least one ceramic powder matrix forming material having a bimodal size distribution, and a binder to form an infiltrated fiber or fiber preform;

b) stacking the infiltrated fiber or fiber preform into a desired thickness and orientation to form a stacked infiltrated fiber or fiber preform;

c) consolidating the stacked infiltrated fiber or fiber preform into a green composite at a first temperature of less than 100° C. and a pressure up to 300 psi, wherein the camphene occupies a plurality of pores in the green composite;

d) freeze-drying the green composite and eliminating the camphene through sublimation in air or under vacuum to form a crack-free ceramic matrix surrounding a rigid fiber network, wherein the crack-free ceramic matrix surrounding the rigid fiber network preserves and defines the plurality of pores occupied by the camphene during the consolidation step; and e) sintering the green composite at a second temperature of greater than 1000° C. to obtain the porous continuous-fiber-reinforced ceramic matrix composite structure.

2. The method of claim 1, wherein the ceramic fibers or fiber preforms comprise an oxide.

3. The method of claim 2, wherein the ceramic fibers or fiber preforms are selected from the group consisting of alumina, $Y_3Al_5O_{12}$, mullite, zirconia, zircon, spinel, cordierite, and mixtures thereof.

4. The method of claim 1, wherein the ceramic fibers or fiber preforms comprise a non-oxide.

5. The method of claim 4, wherein the ceramic fibers or fiber performs are selected from the group consisting of SiC, SiNC, SiBNC, $HfB_2$, TaC, C, and mixtures thereof.

6. The method of claim 1, wherein the ceramic fibers or fiber performs comprise filament wound tapes, woven fabric or a 2.5-dimensional/3-dimensional woven structure.

7. The method of claim 1, wherein the at least one ceramic powder matrix forming material comprises an oxide.

8. The method of claim 7, wherein the at least one ceramic powder matrix forming material is selected from the group consisting of alumina, $Y_3Al_5O_{12}$, mullite, zirconia, zircon, spinel, cordierite, and mixtures thereof.

9. The method of claim 1, wherein the at least one ceramic powder matrix forming material comprises a non-oxide.

10. The method of claim 9, wherein the at least one ceramic powder matrix forming material is selected from the group consisting of SiC, $HfB_2$, $ZrB_2$, $B_4C$, $Ta_xC_y$, $Si_3N_4$, and mixtures thereof.

11. The method of claim 1, further comprising using a first additive to alter a freezing behavior of the camphene, wherein the first additive is added to the slurry containing the camphene.

12. The method of claim 11, wherein the first additive is ethanol.

13. The method of claim 1, further comprising using a second additive to disperse the at least one ceramic powder matrix forming material within the slurry.

14. The method of claim 1, wherein the at least one ceramic powder matrix forming material comprises a mixture of a larger particle size oxide material and a smaller particle size binding phase.

15. The method of claim 14 wherein the larger particle size oxide material is selected from the group consisting of $Y_3Al_5O_{12}$, mullite, and mixtures thereof.

16. The method of claim 14 wherein the smaller particle size binding phase comprises an alumina.

17. The method of claim 14, wherein an average particle size of the larger particle size oxide material is between 0.5 to 4 microns and an average particle size of the smaller particle size binding phase is between 0.01 to 0.5 microns.

\* \* \* \* \*